(12) United States Patent
Benedetti

(10) Patent No.: US 7,984,445 B2
(45) Date of Patent: Jul. 19, 2011

(54) METHOD AND SYSTEM FOR SCHEDULING JOBS BASED ON PREDEFINED, RE-USABLE PROFILES

(75) Inventor: Fabio Benedetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1558 days.

(21) Appl. No.: 11/352,686

(22) Filed: Feb. 13, 2006

(65) Prior Publication Data

US 2006/0195846 A1 Aug. 31, 2006

(30) Foreign Application Priority Data

Feb. 25, 2005 (EP) .................................... 05101454

(51) Int. Cl.
 *G06F 9/46* (2006.01)
 *G06F 9/45* (2006.01)
(52) U.S. Cl. .......................... 718/102; 717/155; 717/156
(58) Field of Classification Search .................. None
 See application file for complete search history.

(56) References Cited

U.S. PATENT DOCUMENTS

| | | | | |
|---|---|---|---|---|
| 6,591,262 | B1 * | 7/2003 | MacLellan et al. ............... | 1/1 |
| 6,944,862 | B2 * | 9/2005 | Caggese et al. ............... | 718/102 |
| 7,027,997 | B1 * | 4/2006 | Robinson et al. ................. | 705/9 |
| 7,185,046 | B2 * | 2/2007 | Ferstl et al. .................... | 709/201 |
| 7,421,621 | B1 * | 9/2008 | Zambrana ........................ | 714/38 |
| 7,620,942 | B1 * | 11/2009 | Ma et al. ........................ | 717/136 |
| 7,653,873 | B2 * | 1/2010 | Brandt et al. .................. | 715/234 |
| 2002/0065701 | A1 * | 5/2002 | Kim et al. .......................... | 705/9 |
| 2002/0138546 | A1 * | 9/2002 | Parsonnet et al. ............. | 709/200 |
| 2004/0034857 | A1 * | 2/2004 | Mangino et al. .............. | 718/104 |
| 2005/0076043 | A1 * | 4/2005 | Benedetti et al. ............. | 707/100 |
| 2006/0020942 | A1 * | 1/2006 | Ly et al. ........................ | 718/100 |
| 2006/0136490 | A1 * | 6/2006 | Aggarwal et al. ......... | 707/103 R |

OTHER PUBLICATIONS

Ian Foster: Chimera: A Virtual Data System for Representing, Querying, and Automating Data Derivation. 14th International Conference on Jul. 24-26, 2002, Piscataway, NJ, USA, IEEE pp. 37-46.

* cited by examiner

*Primary Examiner* — Van H Nguyen
*Assistant Examiner* — Adam Lee
(74) *Attorney, Agent, or Firm* — Yee & Associates, P.C.; Jeffrey S. LaBaw

(57) ABSTRACT

A method for scheduling execution of a work unit in a data processing system, wherein the execution of the work unit involves the execution of at least one program, the method comprising: providing a first collection of pieces of information necessary to execute the work unit, said first collection of pieces of information being arranged in at least one predefined, re-usable program profile corresponding to the at least one program to be executed; receiving, in a request for scheduling execution of the work unit, a second collection of pieces of information necessary to execute the work unit; determining execution information for the execution of the work unit based on the first and second collections of pieces of information, and scheduling the execution of the work unit based on the determined execution information.

6 Claims, 5 Drawing Sheets

METHOD AND SYSTEM FOR SCHEDULING JOBS BASED ON PREDEFINED, RE-USABLE PROFILES

TECHNICAL FIELD

The present invention relates to the data processing field. More specifically, the present invention relates to the methods and systems for the scheduling of work units in a data processing system.

BACKGROUND ART

Scheduling methods are commonly used in a data processing system for controlling the execution of different work units (for example, jobs in a batch processing). For this purpose, several types of schedulers have been proposed in the last years to automate the process of submitting the execution of large quantities of jobs. The schedulers submit the jobs according to a predefined execution plan, which establishes a flow of execution of the jobs according to several factors, such as for example temporal constraints (e.g., date, time, day of the week) and dependencies (such as completion of preceding jobs). An example of scheduler is the "Tivoli Workload Scheduler" by IBM Corporation.

Each job typically involves the execution of a program, and requires several hardware and/or software resources for its execution, such as data processing apparatuses—personal computers, workstations, server machines—operating systems, software applications, databases, storage devices, output devices and the like. The resources that must be used by the job can be specified statically (i.e., identifying the actual physical or logical entities), however most of the available schedulers also allow defining the required resources through their properties; for example, it is possible to specify that the job has to be executed on a computer having a desired operating system, number of processors, installed memory, and so on. In this way, the actual resources, i.e. the actual physical or logical entities to be used when executing the job can be selected dynamically at run-time.

Currently known schedulers operate on the basis of job descriptors. A job descriptor is a collection of several different pieces of information, that may take the form of a file, associated with each job to be executed and containing in particular a description of the program(s) to be executed, the parameter(s) to be passed to the program(s) to be executed, the resource(s) required for the execution, scheduling policies to be applied for the execution of the job. The user is requested to specify, in the descriptor of the job to be submitted to the scheduler for scheduling the execution thereof, all the pieces of information necessary to the scheduler for scheduling the execution and then executing the program(s) associated with the job.

In some solutions known in the art, a same descriptor can be identically used for the scheduling of multiple jobs. In some other solutions, a sort of job descriptor templates are made available to the users for scheduling multiple jobs involving the execution of a same program; when the user wishes to submit a job, he/she has to customize the template so as to specify the parameters that are specific to that job execution.

SUMMARY OF THE INVENTION

The Applicant has observed that the need for the user of building a descriptor for each job to be passed to the scheduler for scheduling the execution, wherein all the pieces of information necessary to the scheduler for scheduling the execution and then executing the program(s) associated with the job are specified, can be a very repetitive task, and also prone to errors, especially when different scheduled jobs involves the execution of a same program with very similar (but not identical) parameters, scheduling policies, resource requirements. Similar considerations can be made in respect of the solution providing for job descriptor templates: it is totally up to the user (and thus susceptible of errors) to customize only those data that need to be specified for the intended execution of the program, identifying and leaving untouched the other pieces of information, that do not vary.

The Applicant has found that it would be desirable to have the possibility of setting default pieces of information, such as parameters, and/or resource requirements, and/or scheduling policies to be applied every time a job involving the execution of a certain program is submitted to the scheduler to be scheduled for execution.

According to an aspect of the present invention, a method as set forth in appended claim 1 is provided for.

The method comprises:

providing a first collection of pieces of information necessary to execute a work unit when the work unit is scheduled for execution, wherein the execution of the work unit involves the execution of at least one program; said first collection of pieces of information is arranged in at least one pre-defined, re-usable program profile corresponding to the at least one program to be executed for the execution of the work unit;

receiving, in a request for scheduling execution of the work unit, a second collection of pieces of information necessary to execute the work unit;

determining execution information for the execution of the work unit based on the first and second collections of pieces of information; and scheduling the execution of the work unit based on the determined execution information.

In particular, the first collection of pieces of information includes data needed for executing the work unit not susceptible of varying from invocation to invocation of the at least one program, and the second collection of pieces of information includes data needed for executing the work unit that are specific of the invocation of the at least one program for the execution of the work unit.

Thanks to the method according to the present invention, it is possible for the user to avoid preparing, for each job to be scheduled for execution, a full descriptor with specified all the different pieces of information needed to the scheduler for executing the job.

Further aspects of the present invention relate to a computer program for performing the above-described method, to a computer program product embodying such computer program, and to a data processing system comprising means for carrying out the steps of the method according to the first aspect of the invention.

BRIEF DESCRIPTION OF THE DRAWINGS

The features and advantages of the present invention will be made apparent by the following detailed description of an embodiment thereof, provided merely by way of a non-limitative example, description that will be conducted making reference to the attached drawings, wherein.

DETAILED DESCRIPTION OF THE PREFERRED EMBODIMENT(S)

Figure 1A:
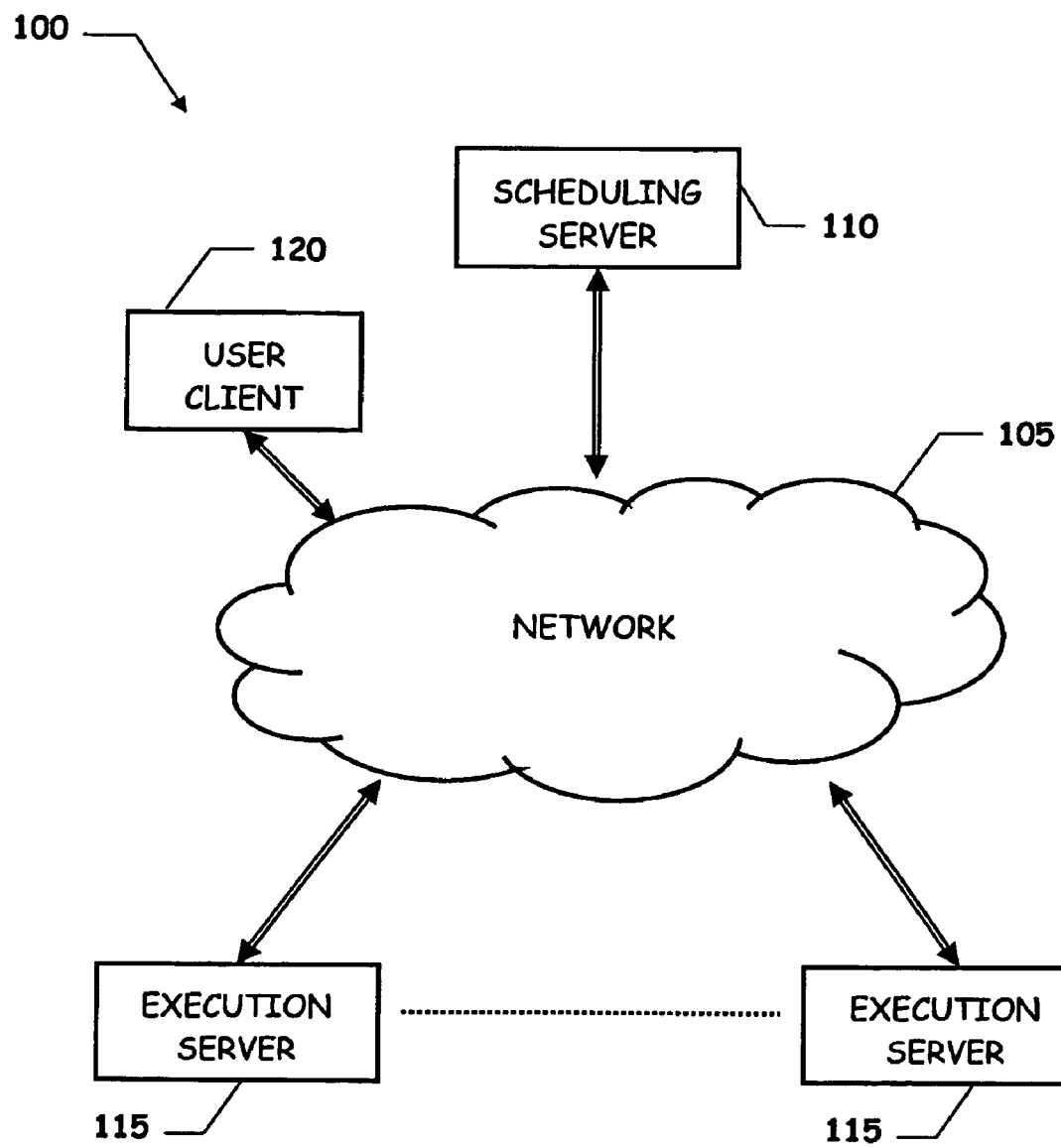
FIG. 1A is a schematic block diagram of a data processing system in which the method according to an embodiment of the present invention is applicable.

With reference in particular to FIG. 1A, a schematic block diagram of an exemplary data processing system 100 is illustrated, in which a method according to an embodiment of the present invention can be applied.

In particular, the exemplary data processing system 100 considered in the invention embodiment being described has a distributed architecture, based on a data communications network 105, which may typically consists in an Ethernet LAN (Local Area Network), a WAN (Wide Area Network), or the Internet. The data processing system 100 may for example be the information infrastructure of a SOHO (Small Office/Home Office environment) or of an enterprise, a corporation, a government agency or the like.

In the data processing system 100, a central scheduling server computer (hereinafter, scheduling server) 110 is used to submit the execution of jobs, particularly but not limitatively non-interactive jobs such as, for example, payroll programs, cost analysis applications, report generation programs, and the like. The scheduling server 110 interacts with one or more other computers or execution server computers (hereinafter, execution servers) 115, which control the actual execution of the jobs submitted by and under the supervision of the scheduling server 110. The scheduling server 110 and the execution servers 115 communicate through the network 105. Also schematically shown is a generic user client machine (user client) 120, through which a generic user submits jobs to the scheduling server 110.

Figure 1B:
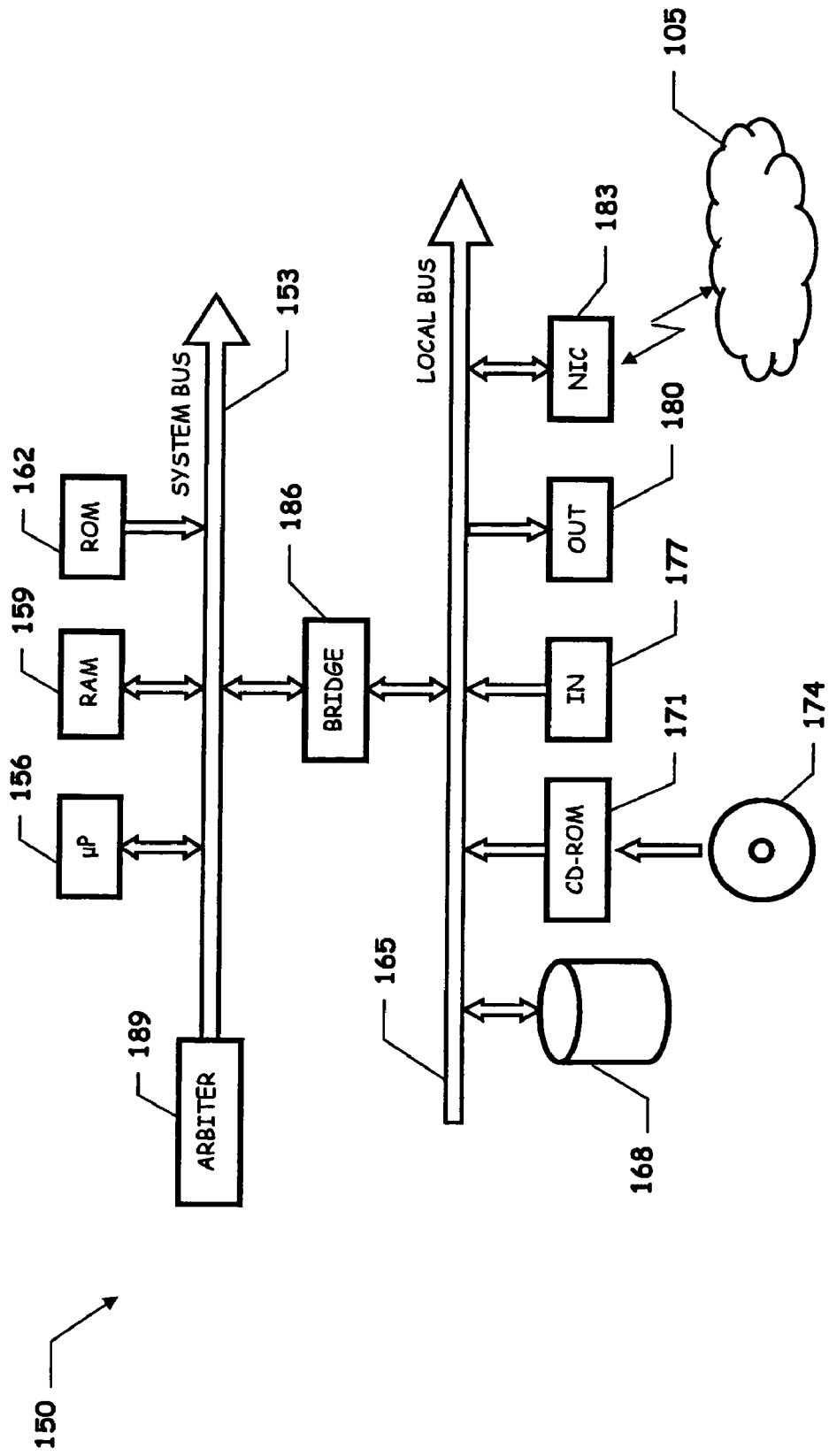
FIG. 1B shows the functional blocks of a generic computer of the data processing system.

As shown in FIG. 1B, a generic computer of the data processing system 100, such as the scheduling server 110 or one of the execution servers 115, denoted with 150, is comprised of several units that are connected in parallel to a system bus 153. In detail, one or more microprocessors (µP) 156 control the operation of the computer 150; a RAM 159 is directly used as a working memory by the microprocessors 156, and a ROM 162 stores the basic code for a bootstrap of the computer 150. Peripheral units are connected (by means of respective interfaces) to a local bus 165. Particularly, mass storage devices comprise a hard disk 168 and a CD-ROM/DVD-ROM drive 171 for reading CD-ROMs/DVD-ROMs 174. Moreover, the computer 150 typically includes input devices 177, for example a keyboard and a mouse, and output devices 180, such as a display device (monitor) and a printer. A Network Interface Card (NIC) 183 is used to connect the computer 150 to the network 105. A bridge unit 186 interfaces the system bus 153 with the local bus 165. Each microprocessor 156 and the bridge unit 186 can operate as master agents requesting an access to the system bus 153 for transmitting information; an arbiter 189 manages the granting of the access to the system bus 153.

Figure 2:
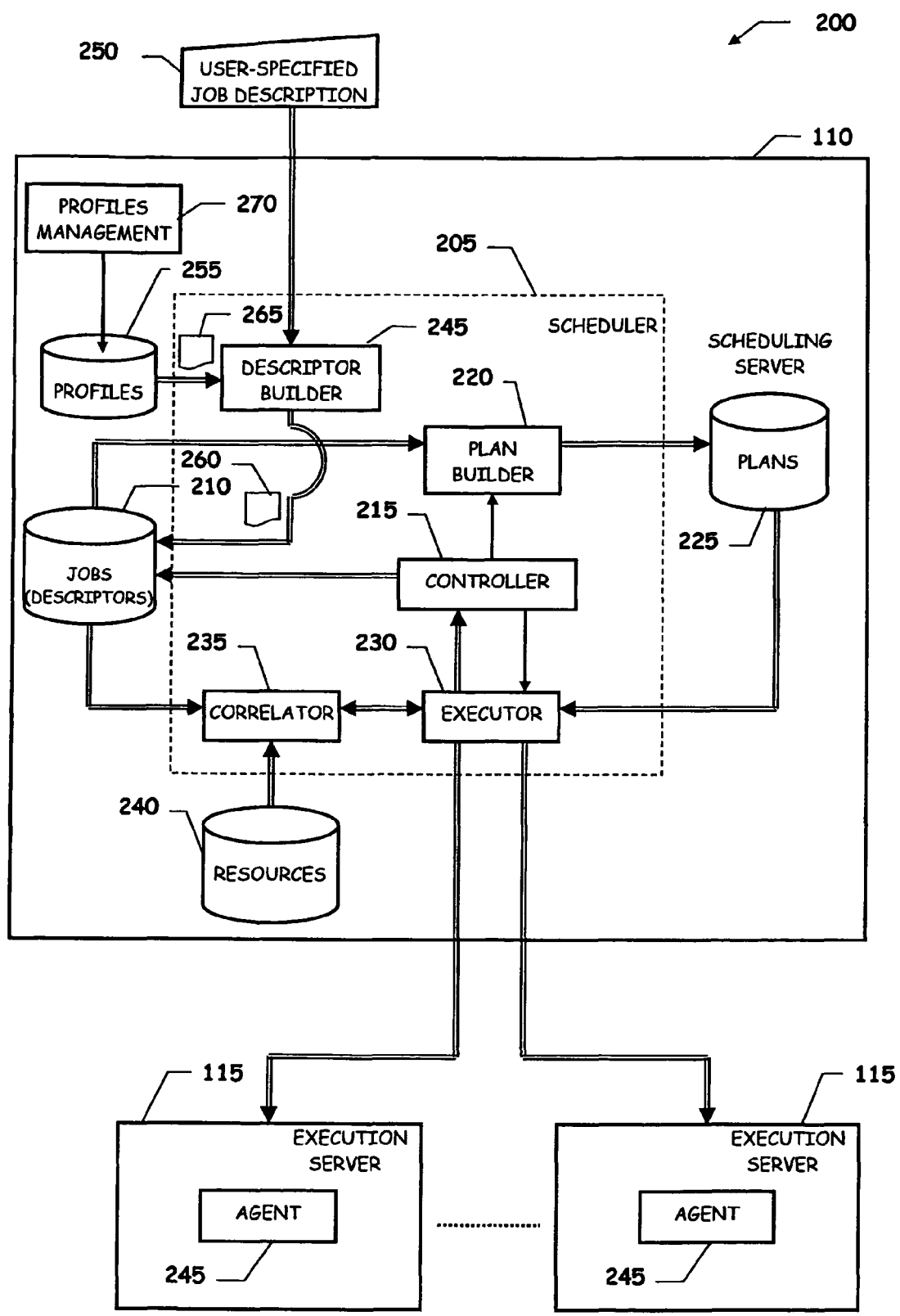
FIG. 2 depicts, in terms of functional blocks, the components, including software components, implementing a method according to an embodiment of the invention.

Referring now to FIG. 2, the components, including software components, implementing a method according to an embodiment of the invention are schematically shown, being denoted as a whole with reference numeral 200. The information (programs and data) is typically stored on the hard disks and loaded (at least partially) into the corresponding working memories when the programs are running. The programs are initially installed onto the hard disks from, e.g., CD-ROMs or DVD-ROMs, or they may be downloaded from, e.g., a distribution server machine through the data communications network 105.

Particularly, a scheduler 205 runs on the scheduling server 110. The scheduler 205 is a software component used to automate the submission of desired jobs in the above-described data processing system. The jobs to be executed by the scheduler 205 are defined in a workload database 210; the workload database 210 includes, for each job submitted to be scheduled for execution, a respective descriptor, written in a suitable control language, for example, a control language based on XML (extensible Markup Language).

In greater detail, as discussed in the introductory part of the present specification, a job descriptor is a collection of several pieces of information, containing a description of the program to be executed for the execution of that job, the parameter(s) to be passed to the program to be executed, the resource required for the execution of the program, the scheduling policies.

The descriptor of the job starts with an execution specification section, which provides information about the execution of the job; for example, the execution specification section may indicate the program to be invoked for the job execution, the program arguments, the values of the respective environmental variable(s), if any, a planned time of execution, an estimated duration, and any possible dependency from other jobs. The descriptor of the job further includes a resource specification section, which provides information about the (hardware and/or software) resources to be used by the job. The resources can consist of any physical or logical entities (for example, computer networks, clusters, organizations, computers, operating systems, applications, databases, storage devices, output devices and the like). The resources required by the job have specific characteristics, including desired properties (such as a computer having a specific operating system, number of processors, amount of memory, and so on); the characteristics of the resources can also include relationships with other resources (such as a computer managing an application running on another computer, an application accessing a remote database, and so on).

The scheduler 205 includes a controller 215, which transmits information about the jobs to be executed to a plan builder 220. The plan builder 220 creates one or more execution plans for controlling a flow of execution of batches of jobs in a desired sequence (for example, covering a period of 24 hours). Each execution plan is built according to the information contained in the job descriptors, extracted from the workload database 210; for example, the execution plans are built based on the temporal constraints and the dependencies of the jobs, as defined in their descriptors. The builder 220 stores the definition of the execution plans thus obtained into a corresponding repository 225.

The controller 215 requests the execution of a selected execution plan to an executor 230. For this purpose, the executor 230 extracts the definition of the current execution plan from the repository 225. As mentioned in the introductory part of the present specification, the resources that need to be used by the job can be specified statically (i.e., identifying the actual physical or logical entities), or through their properties, for example specifying that the job has to be executed on a computer having a desired operating system, number of processors, installed and available memory, storage capacity and so on. In this second case, the actual resources, i.e. the actual physical or logical entities to be used when executing the job can be selected dynamically at run-time. For this purpose, the executor 230 also interfaces with a correlator 235 that, for each job of the execution plan, resolves each formal resource required by the job to be executed (as defined in the respective descriptor extracted from the workload database 210) into one or more actual resources, which possess the desired properties. For this purpose, the correlator 235 accesses a resource repository 240, storing information about the actual resources of the system (with their properties).

The information thus obtained, indicating in particular the actual resources to be used by the job(s) of the execution plan, and especially the execution servers 115, is accordingly used by the executor 230 to submit each job for execution. Particularly, the executor 230 interfaces with an agent 245 running in background on each execution server 115; the agent 245 controls the execution of the jobs on the respective execution server 115 in response to corresponding requests received from the executor 240, and returns thereto feedback information relating to the result of the execution. This feedback information is passed by the executor 230 to the controller 215, which, based on the received feedback information, may for example update the corresponding descriptors of the jobs in the workload database 210 accordingly (for example, changing the expected duration of each job that has just completed as a function of its last duration).

According to an embodiment of the present invention, the scheduler 205 further comprises a job descriptor builder 245, adapted to receive user-specified job descriptions 250, and, based on the received, user-specified job descriptors and on pre-defined profiles, stored for example in a profile repository 255, e.g. in the scheduling server, to build job descriptors 260, which are then stored in the workload database 210.

In greater detail, the profile repository 255 stores, in respect of every possible program which may have to be invoked during the execution of a scheduled job, a profile 265 in which a collection of at least part, preferably most and, even more preferably, all of those pieces of information that are always needed for executing the program, and that are not subject to change from invocation instance to invocation instance of that program, are stored once and for all; preferably, a suitable profile manager utility 270 is provided, adapted to change, update, delete an already existing profile in the profile repository 255, as well as for creating new profiles, when new programs are added to the list of possible executable programs. In other words, the profile for the generic program may include all those parameters, requirements in terms of resources and scheduling policies that are essentially independent from the use of that program that a user may wish to do in a specific instance of execution of the program, i.e. in a specific job scheduled for execution, and that shall always be enforced for every scheduled job that involves the execution of that program. For example, a given program is usually built for running under a specific operating system, or family of operating systems, it may require a minimum amount of memory to be available, the program, when being executed, may need access to a specific database, it may require a minimum amount of available storage area in a computer's file system for the execution results, and so on: all these pieces of information do not change with the specific invocation for execution of that program, and are thus advantageously stored in the associated profile, so to avoid that the user needs to specify them every time he/she wishes to submit a job involving that program. The profile of a generic program may also include formal definitions, for example in the form of variables, of those parameters, requirements, policies that are not fixed, being instead variable from execution instance to execution instance.

The user-specified description 250 includes instead at least all those pieces of information, e.g. additional parameters, requirements and scheduling policies that are specific to that program invocation. In particular, the user-specified description 250 may include specific values for resolving the formal definitions, e.g. to be assigned to corresponding variables, in the profile associated with that program.

The descriptor builder 245 merges the pieces of information in the user-specified description 250 with those in the profile 265 for the specified program, stored in the profiles repository 255, and accordingly generates a descriptor 260, which is then stored in the workload database 210 for being used as described in the foregoing. In particular, the descriptor builder 245 may resolve the formal definitions in the profile, e.g. it may assign to the variables in the profile 265 the values specified in the user-specified description 250.

Figure 3:
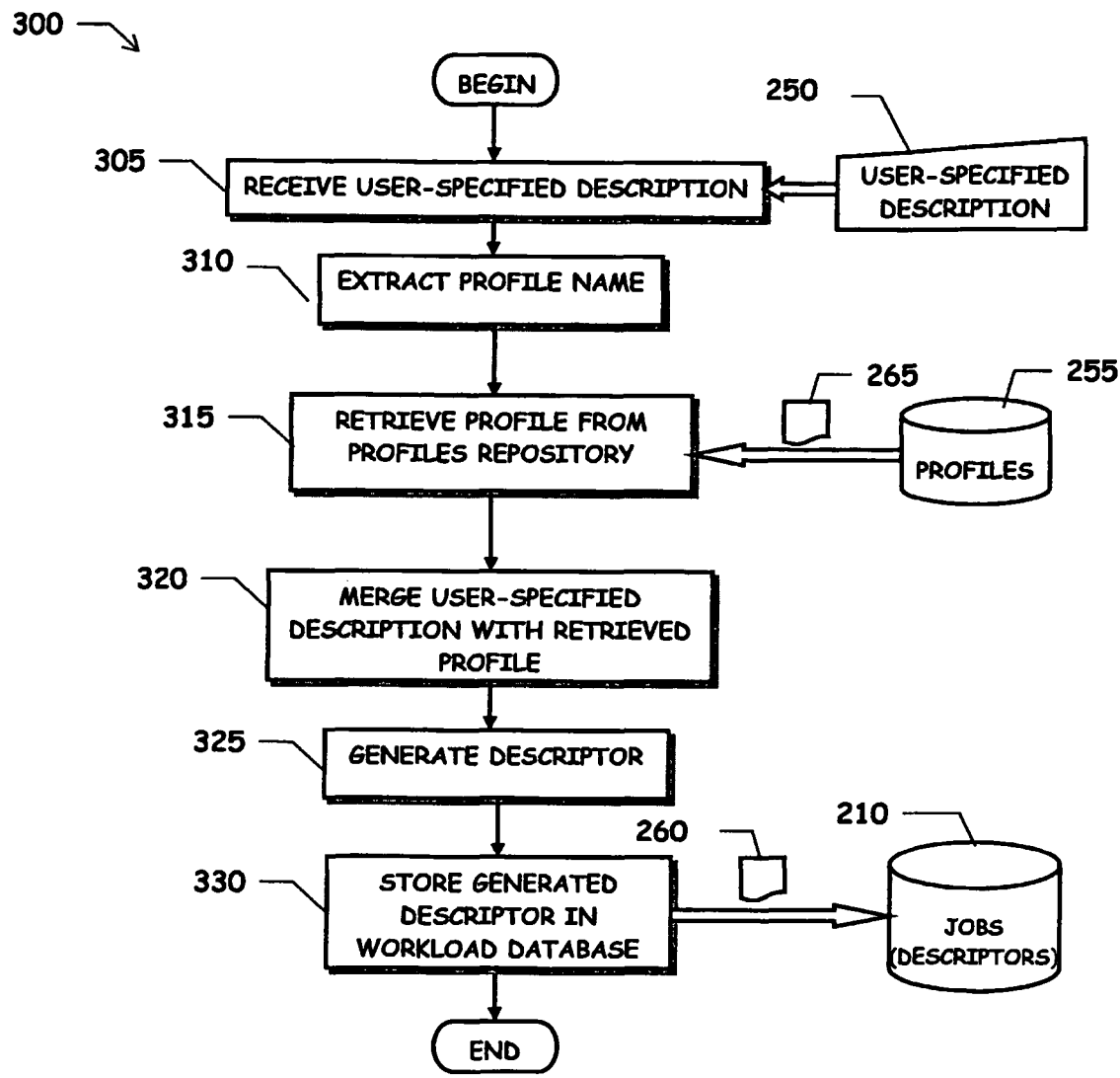
FIG. 3 is a schematic flowchart describing the activities involved in the implementation of a method according to an embodiment of the invention.

A method according to an embodiment of the present invention, by which the scheduling server 110 creates job descriptors based on pre-defined, re-usable program profiles and user-specified descriptions will be now described, making reference to the schematic flowchart of FIG. 3.

An administrator of the scheduling service, possibly the administrator of the data processing system 100, prepares, using for example the profiles management component 270 of the scheduler 205, one or more profiles for the programs the execution of which may be requested in jobs that can be submitted to the scheduling server 110. The profiles to be prepared in respect of the generic program preferably includes, as mentioned in the foregoing, a collection of at least part, preferably most or, even more preferably, all of those pieces of information that are always needed for executing the program, and that are not subject to change from invocation instance to invocation instance of that program. In particular, the generic profile may include a profile name section with the profile name, for purposes of identification among the different program profiles, a program execution specification section, specifying the associated program to be invoked, together with the information necessary for the execution thereof (e.g., the standard input, the standard output, the standard error, the initial directory), the arguments to be passed to the program, a resource specification section defining the characteristics of the logical/physical resources needed for the execution of the program. The generic profile may include variables, which for the execution of the program need to be resolved with values specific of the execution instance under consideration.

The prepared profiles are stored in the profiles repository 255. The administrator is also responsible of managing the profiles already in the repository, e.g. changing/upgrading the profiles (for example, in consequence to changes to the program to which the profile relates), or deleting obsolete ones.

Using tools that may be per-se conventional, such as software client applications running on the user client 120 for interacting with the scheduler running on the scheduling server 110, a user prepares on his/her machine a job description. Differently from the conventional way of preparing job descriptors, the user needs not specify all the pieces of information needed for executing the associated program: in particular, in a preferred embodiment of the invention only those pieces of information that are specific to the program invocation that will be done in the execution of that job need to be specified, including values to be assigned to corresponding variables in the profile associated With that program. In particular, the generic user-specified job description may include a job name section, specifying the name of the job being submitted, an execution information section, including a program profile name section, specifying the name of the program profile to be used, a variable values assignment section, in which values are assigned to the variables present in the profile (further arguments to be passed as parameters by the program to be executed can be included), a resource specification section, specifying further logical/physical resource requirements in addition to those already specified in the profile.

The user-specified job description is submitted to the scheduler 205.

The scheduler 205 receives the user-specified job description 250, which is passed over to the descriptor builder 245 (block 305).

The descriptor builder 245 sorts the received user-specified job description 250, and extracts from the execution information section the name of the profile to be used (block 310).

Based on the profile name extracted from the received user-specified job description 250, the descriptor builder 245 accesses the profiles repository 255 and retrieves the proper profile 265 (block 315).

The descriptor builder 245 then merges the information in the retrieved profile 265 with those in the received user-specified job description 250 (block 320). In particular, the descriptor builder 245 resolves the formal definitions present in the profile 265, e.g. assigning to the variables the corresponding values found in the user-specified job description 250, combines the resource requirements listed in the profile and the user-specified job description, and thus generate a complete job descriptor 260, including all the pieces of information needed for the execution of that job (block 325).

The descriptor builder 245 then stores the generated descriptor 260 in the workload database 210 (block 330).

In an embodiment of the present invention, the descriptor builder may check for any inconsistency between the pieces of information in the profile, and those in the user-specified description, for example inconsistencies between the resource requirements, and, in case any inconsistency is identified, notify the submitting user.

The job descriptor generation process ends (unless there are other job descriptors to be generated).

Figure 4:
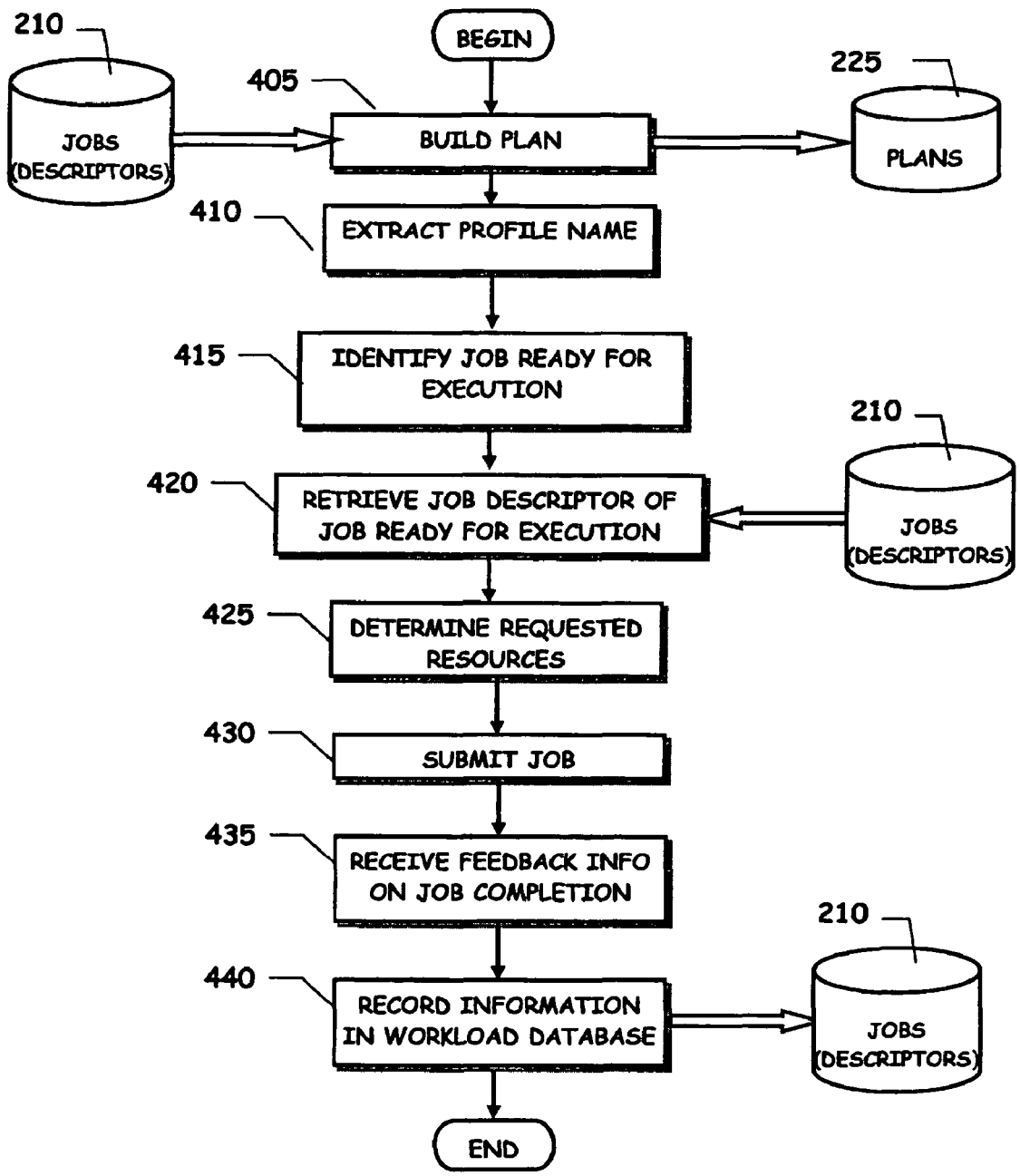
FIG. 4 is a schematic flowchart describing the activities involved in the scheduling of jobs.

The job specified by the job descriptor 260 stored in the workload database 210 will then be executed as usual: as schematically shown in the simplified flowchart of FIG. 4, exploiting the job descriptors stored in the workload database 210, the plan builder 220 builds an execution plan, which is stored in the plans repository 225 (block 405).

The generated execution plan is submitted to the executor 230, which identifies the jobs that are available for being executed, according for example to their planned time of execution and their dependencies (block 410).

For each job available for execution, the executor 230 retrieves the corresponding descriptor from the workload database 210 (block 420).

The resource specification section of the retrieved job descriptor is then passed to the correlator 235, for determining the required resources (block 425). The correlator 235 parses the received information: whenever the definition of a formal resource to be used by the job is encountered, the correlator, accessing the resource database 240, identifies the (eligible) actual resources that possess the required properties. As a result, each formal resource is resolved into one or more concrete resources, possessing the desired properties.

The information thus obtained is returned to the executor 230. In response thereto, the executor selects a single actual resource for each formal resource (when more eligible actual resources are available); for example, this operation is simply performed according to a random algorithm.

The executor 230 submits the job, using the selected actual resources (block 430), for example one or more of the execution servers 115.

The above operations are repeated on the other jobs of the execution plan still to be submitted.

After submitting the job, the executor 230 waits for a feedback information from the agent 245 of the execution server on which the job has been submitted. As soon as a generic job terminates, the executor receives the corresponding feedback information (block 435). The executor passes the feedback information to the controller 215, which logs it into the workload database 210 (block 440). Moreover, the controller updates the estimated duration of the job in the workload database accordingly; for example, the estimated duration is calculated as a running average of the values that have been measured for the completed instances of the job (preferably filtering very different values as anomalies). These operations are repeated for the other jobs of the execution plan.

Two practical examples are reported hereinbelow, that further clarify the operation of the scheduling server 110 and, particularly, of the descriptor builder 245 of the scheduler 205 in an exemplary embodiment of the present invention.

EXAMPLE 1

Let genreport be the name of a report generation program, having associated therewith the following profile (stored in the profile repository 255—the profile language is a control language based on XML):

<profile name="genReport">
    <program shell="ksh"script="/usr/genreport.sh"
      standardInput="/dev/null"
      standardOutput=$outfile
      standardError=$errlog
      initialDirectory="/home/$user>
      <argument>-user</argument>
      <argument>$user</argument>
      <environmentVariable name="JDK_HOME">
        /usr/jdk1.3
      </environmentVariable>
    <resource>
      <resourceRequirement
        resourceType="OperatingSystem">
        OSType="AIX" and OSVersion>="5.1"
      </resourceRequirement>
      <resourceRequirement
        resourceType="MemorySubsystem">
        Memory>=100M
      </resourceRequirement>
    </profile>

The profile (specified between the tags <profile> and </profile>) starts with a name assignment (name=), and includes an execution specification section (comprised between the tags <program> and </programs>) in which the program to be invoked is defined, together with the standard input (standardInput=), the standard output (standardOutput=), the standard error (standardError=), the initial directory (initialDirectory=); also defined in the execution specification section are the arguments to be passed to the program (each argument being comprised between a respective pair of tags <argument> and </argument>) and the values of the environment variables (tags <environmentVariable> and </environmentVariable>), if any. Following the execution specification section is a resource specification section (tags <resource> and </resources>) defining the characteristics of the logical/physical resources needed for the execution of the program.

In particular, one or more resource requirements are specified in the resource specification section (tags <resourceRequirement> and </resourceRequirement>).

In the example considered, the profile is named genReport, the corresponding program is a shell script /usr/genreport.sh, the standard input is set to the value /dev/null, the standard output and the standard error are not assigned a fixed value, being instead set to respective variables named $outfile and $errlog, the initial directory is set to be the directory /home of the user specified in a variable named $user. The parameters (arguments) to be passed to the program are -user and $user, for generating a report for the user specified as a value of the variable $user. The environment variable named JDK_HOME is set to /usr/jdk1.3. In the resource specification section, there is specified that the program requires for execution a machine with operating system AIX version 5.1 or higher, and a minimum of 100 M of memory.

Let it be assumed that a user submits a job to the scheduling server 110, providing the following user-specified job description:
    <job name="fabioReport" category="Accounting">
    <program profile="genReport"
        <variable name="user">fabio</variable>
        <variable name="outfile">/tmp/fabioreport
        </variable>
        <variable name="errlog">/tmp/fabioerrlog
        </variable>
        <argument>-verbose</argument>
    </program>
    <resource>
        <host name="fabio*.ibm.com">
        <resourceRequirement resourceType="FileSystem">
        FreeDisk>=200M
        </resourceRequirement>
    </resource>
    </job>.

The user-specified description defines the name fabioReport of the submitted job, the name genReport of the program profile to be used, the value fabio to be assigned to the variable $user, the value /tmp/fabioreport to be assigned to the variable outfile, the value /tmp/fabioerrlog to be assigned to the variable errlog; also specified is a further argument to be passed to the program to be executed, in the example the parameter -verbose. The user-specified description further includes a resource specification section in which resource requirements are specified (in addition to those specified in the profile of the program); in particular, the user-specified job description requires that the program be executed on any machine in the pool including the name fabio.ibm.com (e.g., fabioMain.ibm.com, fabioSecondary.ibm.com, fabioLaptop.ibm.com), that the resulting report is expected to be very big and therefore the job requires a 200 M of disk space.

Upon receipt of the job submission by the user, with the user-specified description, the scheduling server 110, in the exemplary embodiment previously described the descriptor builder 245, retrieves the profile named genReport from the profile repository, and build the job descriptor by merging the information contained in the retrieved profile with those in the user-specified job description. In particular, the descriptor builder 245 resolves the variables in the program profile with the corresponding values specified in the user-defined description. The descriptor built by the descriptor builder 245 specifies that the program to be executed is the program name /user/genreport.sh, to which the parameters -user fabio and -verbose are to be passed as arguments; the standard input is set to /dev/null, the standard output is set to /tmp/fabioreport, the standard error is set to /tmp/fabioerrlog, the initial directory is set to /home/fabio, and the environment variable named JDK_HOME is set to /usr/jdk1.3. The job descriptor specifies that the program needs, for execution, an operating system AIX version 5.1 or higher, with a minimum of 100 M of memory and a minimum of 200 M of free disk space. The machine matching the above criteria is to be chosen in the pool including the name fabio.ibm.com (e.g., fabioMain.ibm.com, fabioSecondary.ibm.com, fabioLaptop.ibm.com).

EXAMPLE 2

Considering again the program /usr/genreport.sh with the associated profile genreport discussed in the previous example, let it be assumed that another user submits another job to the scheduling server 110 involving the execution of the same program, and providing the following user-specified job description:
    <job name="johnReport" category="Accounting">
    <program profile="genReport"
        <variable name="user">john</variable>
        <variable name="outfile">/tmp/johnreport
        </variable>
        <variable name="errlog">/dev/null</variable>
    </program>
    <resource>
        <host name="john.ibm.com">
        <resourceRequirement resourceType="FileSystem">
        Freedisk>=10M
        </resourceRequirement>
    </resource>
    </job>.

The user-specified description defines the name johnReport of the submitted job, the name genReport of the program profile to be used, the value john to be assigned to the variable $user, the value /tmp/johnreport to be assigned to the variable outfile, the value /dev/null to be assigned to the variable errlog. In the resource specification section of the user-specified description, resource requirements are specified (in addition to those specified in the profile of the program), requiring that the program be executed on the target machine john.ibm.com, and that for saving the resulting report at least 10 M of disk space are necessary.

Upon receipt of the job submission by the user, with the user-specified description, the descriptor builder 245, retrieves the profile named genReport from the profile repository, and builds the job descriptor by merging the information contained in the retrieved profile with those in the user-specified job description. In particular, the descriptor builder 245 resolves the variables in the program profile with the corresponding values specified in the user-defined description. The descriptor built by the descriptor builder 245 specifies that the program to be executed is the program name /user/genreport.sh, to which the parameter -user john is to be passed as an argument; the standard input and the standard error are set to /dev/null, the standard output is set to /tmp/johnreport, the initial directory is set to /home/john, and the environment variable named JDK_HOME is set to /usr/jdk1.3. The job descriptor specifies that the program is to be executed on the machine john.ibm.com, that an operating system AIX version 5.1 or higher is required, with a minimum of 100 M of memory and a minimum of 10 M of free disk space.

In case the scheduler 205 ascertains that the target machine specified in the user-defined description does not match the criteria (resource requirements) specified in the profile, for example the operating system installed on the machine john.ibm.com is not AIX, or the version is not 5.1 or higher, or there is not 100 M of memory, or 10 M of free disk space, the job status is set to an error, and the submitter user is preferably notified.

Thanks to the present invention, it is no more necessary to specify all the pieces of information needed for executing a program upon submission of the job to the scheduler: those data that are expected to change from invocation to invocation of the program are defined and stored in a program profile which is reusable for all the jobs involving the execution of that program. The user is only requested to specify, when submitting a job top the scheduler, those data which are specific of that program instantiation. This makes the process of submitting jobs to the scheduler less tedious, and less prone to errors.

Moreover, changes to the program profile, e.g. in consequence of changes in the program, are automatically applied to all the following jobs that involve execution of that program, without the need for users to change to the user-specified descriptors.

The implementation of the present invention has been described making reference to an exemplary embodiment thereof, however those skilled in the art will be able to envisage modifications to the described embodiment, as well as to devise different embodiments, without however departing from the scope of the invention as defined in the appended claims.

For example, although in the described embodiment a job descriptor is built upon receipt by the scheduler of a request for job submission from a user, this is not a limitation to the present invention: in an alternative embodiment, the generation of a job descriptor may for example be dispensed for, and the scheduler may determine the program to be executed, pass thereto the required parameters, determine the resource requirements "on the fly", at the time of execution of the scheduled job.

Even though in the preceding description reference has been made to non-interactive jobs, this is not to be intended as a limitation; indeed, the method of the invention can be used to schedule the execution of any kind of work units (for example, interactive tasks). Moreover, the proposed method applies to every job or to selected ones only, and to every resource or to some of them only.

The invention can be applied in a data processing system having a different architecture or based on equivalent elements; each computer can have another structure or it can be replaced with any data processing entity (such as a PDA, a mobile phone, and the like).

The programs may be pre-loaded onto the hard disks, or be sent to the computers through the data communications network, or be broadcast, or more generally they can be provided in any other form directly loadable into the working memories of the computers.

The method according to the present invention also leads itself to be carried out with a hardware structure (for example, integrated in chips of semiconductor material), or with a combination of software and hardware.

The invention claimed is:

1. A method for scheduling execution of a work unit in a data processing system, wherein the execution of said work unit involves the execution of a program, the method comprising:
by a scheduler in a scheduling apparatus, receiving, in a request for scheduling execution of the work unit, input from a user comprising user-defined data necessary to execute the work unit, said user-defined data including data that is specific to the particular invocation of the program for the execution of the work unit, and said user-defined data including one or more among values of arguments to be passed to the program and information about resources requested for execution of the program;
retrieving, by the scheduler, pre-defined data necessary to execute the work unit from a profile repository, said pre-defined data being arranged in a re-usable profile of the program to be executed, said pre-defined data including data not subject to change from invocation to invocation of the program, and said pre-defined data including one or more among information identifying the corresponding program to be executed, arguments to be passed to the program, and information about resources requested for the execution of the program;
generating, by a descriptor builder in the scheduler, a work unit descriptor for the execution of the work unit by merging user-defined data and the pre-defined data, wherein said pre-defined data includes formal parameters and said user-defined data includes values to be assigned to the formal parameters, and wherein merging the user-defined data and the pre-defined data includes resolving the formal parameters in the pre-defined data by assigning thereto the respective values in the user-defined data; and
scheduling the execution of the work unit based on the generated work unit descriptor.

2. The method according to claim 1, in which said user-defined data includes an execution specification section that specifies the pre-defined data to be retrieved from the profile repository.

3. A computer program in a non-transitory computer readable storage medium directly loadable into a working memory of a data processing system for performing the method for scheduling execution of a work when the computer program is executed on the data processing system, comprising the steps of:
receiving, in a request for scheduling execution of the work unit, input from a user comprising user-defined data necessary to execute the work unit, said user-defined data including data that is specific to the particular invocation of the program for the execution of the work unit, and said user-defined data including one or more among values of arguments to be passed to the program and information about resources requested for execution of the program;
retrieving pre-defined data necessary to execute the work unit from a profile repository, said pre-defined data being arranged in a re-usable profile of the program to be executed, said pre-defined data including data not subject to change from invocation to invocation of the program, and said pre-defined data including one or more among information identifying the corresponding program to be executed, arguments to be passed to the program, and information about resources requested for the execution of the program;
generating a work unit descriptor for the execution of the work unit by merging the user-defined data and the pre-defined data, wherein said pre-defined data includes formal parameters and said user-defined data includes values to be assigned to the formal parameters, and wherein merging the user-defined data and the pre-defined data includes resolving the formal parameters in the pre-defined data by assigning thereto the respective values in the user-defined data; and
scheduling the execution of the work unit based on the generated work unit descriptor.

4. The computer program according to claim 3, in which said user-defined data includes an execution specification section that specifies the pre-defined data to be retrieved from the profile repository.

5. A data processing system for scheduling execution of a work unit wherein the execution of said work unit involves the execution of a program, comprising:

a bus;

a storage device connected to the bus, wherein the storage device contains computer usable code; and a processing unit connected to the bus, wherein the processing unit executes the computer usable code to receive, in a request for scheduling execution of the work unit, input from a user comprising user-defined data necessary to execute the work unit, said user-defined data including data that is specific to the particular invocation of the program for the execution of the work unit, and said user-defined data including one or more among values of arguments to be passed to the program and information about resources requested for execution of the program; retrieve pre-defined data necessary to execute the work unit from a profile repository, said pre-defined data being arranged in a re-usable profile of the program to be executed, said pre-defined data including data not subject to change from invocation to invocation of the program, and said pre-defined data including one or more among information identifying the corresponding program to be executed, arguments to be passed to the program, and information about resources requested for the execution of the program; generate a work unit descriptor for the execution of the work unit by merging the user-defined data and the pre-defined data, wherein said pre-defined data includes formal parameters and said user-defined data includes values to be assigned to the formal parameters, and wherein merging the user-defined data and the pre-defined data includes resolving the formal parameters in the pre-defined data by assigning thereto the respective values in the user-defined data; and schedule the execution of the work unit based on the generated work unit descriptor.

6. The data processing system according to claim 5, in which said user-defined data includes an execution specification section that specifies the pre-defined data to be retrieved from the profile repository.

* * * * *